Sept. 19, 1950 R. E. SHVETZ 2,522,727

CONTROL DEVICE FOR THE AUTOMATIC RECORDING OF TELEPHONE CONVERSATIONS

Original Filed Dec. 16, 1948 2 Sheets-Sheet 1

INVENTOR
Roman E. Shvetz
by Robert Irving Williams
ATTORNEY

INVENTOR
Roman E. Shvetz
by Robert Irving Williams
ATTORNEY

Patented Sept. 19, 1950

2,522,727

UNITED STATES PATENT OFFICE 2,522,727

CONTROL DEVICE FOR THE AUTOMATIC RECORDING OF TELEPHONE CONVERSATIONS

Roman E. Shvetz, New York, N. Y.

Original application December 16, 1948, Serial No. 65,664. Divided and this application April 14, 1950, Serial No. 156,002

3 Claims. (Cl. 179—6)

This invention relates to control devices for the automatic recording of telephone conversations.

This application is a division of my co-pending application, Serial No. 65,664, filed December 16, 1948.

A prime consideration in such devices is that the telephone instrument and its use be modified and encumbered as little as possible when the called party is present, and that the installation of the recorder connections and the initiation and termination of the recording operation be as easy and simple as possible. A number of types of control devices have been proposed for use, but these have been subject to various limitations which have interfered with their general adoption. In many, it is necessary to provide an electric connection with the bell circuit in the instrument stand, requiring extra wiring which sometimes interferes with the free movement of the stand. Others require mechanical connection of parts of the recorder or the control mechanism with the instrument stand in such a manner that its use is undesirably interfered with when the called party is present. Others are unduly complex in construction, and others are ineffective, inaccurate, or complex in operation.

It is an object of the present invention to provide a simple, certain, and effective control means which can be installed and operated with extreme ease and which will leave the telephone instrument free for use in a completely normal manner whenever the called party is present.

Another object is the provision of control means which is readily adaptable to use in a variety of ways and under a variety of conditions to meet a variety of requirements.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawings, in which.

The invention contemplates the use of the mechanical movement of the ringing bell to initiate the operation of the control means, to provide a positive operation free from likelihood of actuation by the vibrations of passing vehicles or other mechanical or accidental jarring.

The invention may make use of the fact that in any given locale and under any given conditions messages tend to run to a similar length of time to which an adjustable timer, as exemplified, can be adjusted; and of the further fact that a calling party who has a long message can call back as many times as he needs to complete the message.

Alternatively, if desired, a connection may, in certain instances, be made to the talking circuit. In any instance where this is impractical or undesirable, however, the invention is fully operative and effective without it.

Figure 1:
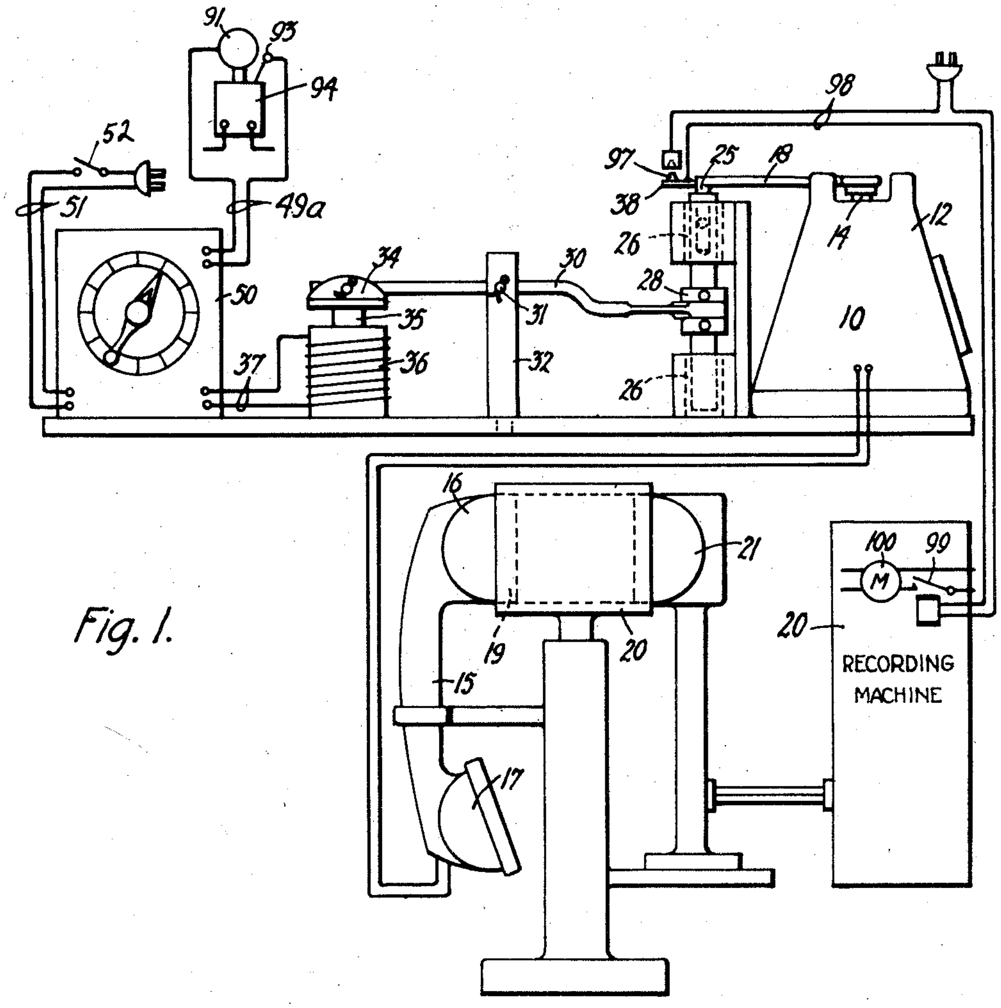
Figure 1 is a somewhat diagrammatic side view of a telephone and recorder combination embodying one form of the invention.
Figure 2:
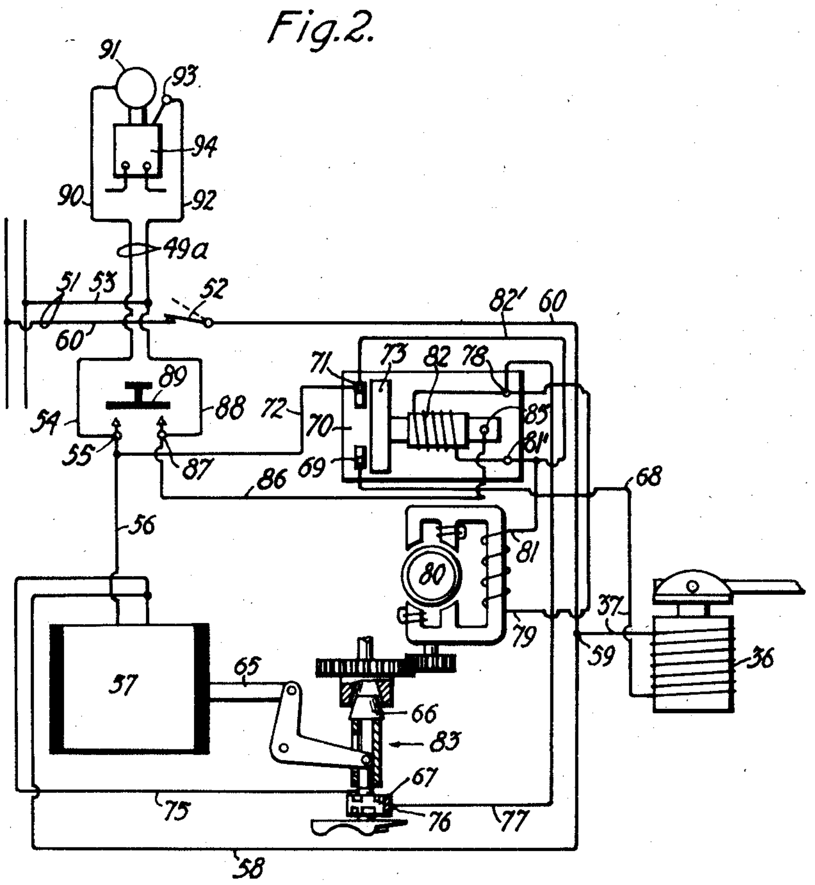
Fig. 2 is a wiring diagram of a timer used therein.
Figure 3:
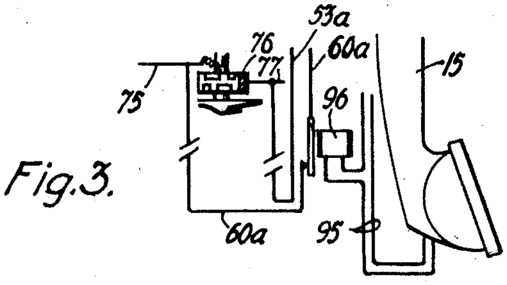
Fig. 3 is a similar view showing a modified form.

In the form of construction exemplified in Figs. 1–3 there is provided a telephone instrument 10 which, in the present instance, is of the hand-set type. The base 12 thereof contains the usual electric connections, and carries the usual depressible switch member 14 which is normally held down by the removable unit 15 carrying the receiver 16 and the transmitter 17. The telephone operates entirely normally when the called party is present. When he leaves, however, he can remove unit 15, and, while holding the switch member 14 depressed, bring the switch member 14 under the arm 18 of a control device. To effectuate this either the instrument 10, the control device, or the arm 18 may be moved. The unit 15 may be seated on a recorder 20 as shown at 19, for example, with the receiver 16 in proximity to the reception means (or mouthpiece) 21 of the recorder. The arm 18 is mounted on an upright 25 which is mounted in bushings 26 for vertical movement. Carried on the upright 25 by means of clamp rings 28 is one end of a control lever 30 which is pivoted at 31 on a post 32, and the other end of which is pivoted to the head 34 of the armature 35 of a relay 36 energized by a circuit portion 37 leading to a time switch 50 of adjustable duration.

A manual disconnect switch 52 is provided in a circuit 51, in the present instance. When this is closed, the time switch controls transmission of current from a power circuit 51 to operating circuit portion 37 under control of circuit portion 49*a*.

Pursuant to the invention in its broader aspects any well known or suitable form of time switch may be employed. In the particular form of time switch exemplified, lead 53 connects one line of circuit 49*a* with one line of circuit 51. From the other line of circuit 49*a* a lead 54 extends to point 55, and thence lead 56 runs to magnetic switch 57 to energize it thru a circuit including lead 58 which runs to point 59 and lead 60 which runs to the other line of the circuit 51. The magnetic switch 57 operates lever 65 which engages clutch 66 and operates the start-stop switch 67.

One line of circuit portion 37 runs to point 59 and the other line connects with lead 68 which runs to contact 69 of magnetic switch 70. From a contact 71 of switch 70, a lead 72 leads to point 55. T-conductor 73 connects contacts 69 and 71 to lead 86 and 53 when the switch 70 is operative. Also running from conductor 58 is a lead 75 running thru a contact 76 which is closed by the start-stop switch and from which a lead 77 runs to point 78 whence lead 79 runs to motor 80 from which lead 81 runs to point 81′ to which coil 82 of switch 70 is connected. The other end of the coil is connected to point 78. A lead 82′ runs from 82 to contact 71. Motor 80 drives a clock mechanism 83, under control of clutch 66. From contact 85 on T 73, lead 86 runs to point 87, whence lead 88 runs to lead 53. A spring-return, momentary action push button, as shown at 89, may be provided to interconnect the points 55 and 87 to short-circuit the circuit 49*a*, as for checking purposes, if desired.

Thus, when the circuit 49*a* is closed, a circuit is closed thru leads 53, 54, 56, 57, 58, and 60 energizing the magnetic switch 57 to operate clutch 66, and start-stop switch 67, which closes a circuit thru 60, 58, 75, 76, 77, 82, 82′, 72, 54, 49, 53. As soon as current flows thru coil 82, the T 73 is moved, and a circuit is closed thru 60—58—75—76—77—82—82′—71—73—85—86—87—88—53, and a parallel circuit running from 77 thru 79, 80, 81 and 82′ to 71 drives the clock motor. The energization of switch 70 operates relay 36 thru circuit 60—37—68—69—73—85—86—87—88—53. This remains energized until the clock 83, as set, disconnects the start-stop switch 67, breaking the contact 76, with resulting de-energization of all the circuits until the vibration switch next operates.

As above indicated, there are many instances where telephones are located in places particularly subject to vibration. In any such instance there may be used an arrangement such as shown wherein the circuit 49*a* comprises a lead 90 running to the bell 91 of a telephone instrument such as the instrument 10, and a lead 92 running to the clapper 93 of the bell. As soon as the clapper head is drawn against the bell to ring it, as by magnet 94, the contact of the metal clapper with the metal bell closes the circuit.

It is to be noted that, while the circuit 49*a* operates electrically, it is closed by mechanical movement, and accordingly the control means of which it is a part are mechanically rather than electrically actuated. This distinction is fundamental, for it is unnecessary to splice a lead into the telephone bell circuit or to otherwise make any electrical connection to or impose any extra load on the telephone circuits for the control means. If the "beep" or other recorder noise is permitted to enter the telephone transmitter no connection into the telephone circuits at all is necessary. If, however, there is a standard electrical "beep" connection, it will still be advantageous to avoid any non-standard connection.

While the invention is capable of use without any physical connection with the telephone instruments or circuits as in the case of the exemplification of Figs. 1 and 2, and while it is capable of use without any electrical connection with the telephone circuits there are, as above indicated, instances in which the advantages of operating the control device when the calling party breaks a telephone circuit outweigh other considerations. In such instances there may be employed an arrangement such as exemplified in Fig. 3 wherein the telephone circuit 95 operates a micro-switch 96 in one of the power inlet leads, as, for example, lead 60*a*, so that, when the calling party hangs up before the pointer on the clock actuates the start-stop switch 67, the break in the circuit by the micro-switch 96 will cause the de-energization of relay 36 and of the power circuit for the recording machine.

In various exemplified forms there is provided actuating means for the recorder 20. In the present instance, this comprises a contact 97 which is carried on arm 38 and which closes a circuit 98 for operating a switch 99 to energize motor 100 of recorder 20.

Thus there is provided a simple and highly effective means for recording a telephone message. The calling party, being apprized by the termination of the ringing signal without reply by the called party that there is no one present, and by the recording noise that there is a recorder to take a message, will give that message.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

1. A control device for use in connection with the recording of telephone messages, comprising a movable arm for the control of a talking-circuit switch, means including an electrical control for imparting mechanical movement to said arm, a metallic telephone bell, a metallic bell clapper, an electric circuit running from said bell to said clapper, and means including said circuit for actuating said electrical control when the clapper makes contact with the bell to complete the circuit.

2. A control device for use in connection with the recording of telephone messages comprising a telephone bell having a movable metallic member movable against another metallic member, a movable arm for the control of a talking-circuit switch, means including an electrical control for imparting mechanical movement to said arm, a circuit which comprises a line running to one of said metallic members and a line running to the other of said metallic members and which is closed by the contact of said metallic members with each other, and a magnetically-controlled recorder-starting mechanism actuated by said arm-operating circuit.

3. A control device as set forth in claim 2 wherein there is provided an electrical connection with a telephone talking circuit, magnetic means in said electrical connection, and means under control of said magnetic means for permitting the return of said arm when a telephone talking circuit is broken.

ROMAN E. SHVETZ.

REFERENCES CITED

The following references are of record in the file of this patent:

UNITED STATES PATENTS

| Number | Name | Date |
|---|---|---|
| 907,960 | Boelen | Dec. 29, 1908 |
| 1,778,980 | McKeldin | Oct. 21, 1930 |
| 2,393,272 | Van Deventer | Jan. 22, 1946 |